INVENTOR
Clarence T. Rottler
Harry Bowen
ATTORNEY

Patented Jan. 6, 1925.

1,522,145

UNITED STATES PATENT OFFICE.

CLARENCE T. ROTTLER, OF SEATTLE, WASHINGTON.

CUTTER HEAD.

Application filed December 18, 1923. Serial No. 681,330.

*To all whom it may concern:*

Be it known that I, CLARENCE T. ROTTLER, a citizen of the United States, residing at Seattle, county of King, and State of Washington, have invented a new and useful Cutter Head; and I do hereby declare that the following is a full, clear, and exact specification, such as will enable others skilled in the art to which it appertains to make and use the same.

The invention is a cutter head in which some of the blades are set at different distances from the center than others.

The object of the invention is to provide a cutter head for reboring cylinders which will take a rough and finishing cut at the same time.

Another object of the invention is to provide a cutter head with which cylinders may be rebored by hand.

And a further object of the invention is to provide a simple and efficient cutter head by which cylinders may be rebored absolutely accurate in a very few minutes.

With these ends in view the invention embodies a cutter head having a plurality of blades set in longitudinal grooves and having tapering pins in adjacent grooves for holding the blades in place, said cutter head being adaptable to be attached to the end of a spindle.

Other features and advantages of the invention will be seen from the following description taken in connection with the drawings, wherein:—

Figure 1:
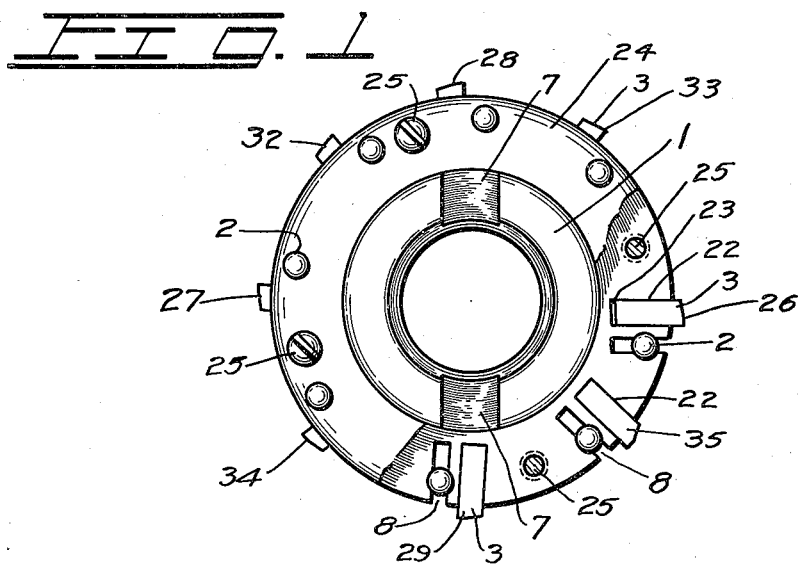
Figure 1 is a top plan view with part broken away.

In the drawings I have shown my device as it would be constructed wherein numeral 1 indicates the cutting head, numeral 2 the pins for holding the blades, and numeral 3 the blades.

The head 1 may be constructed as shown with a tapering opening 4 in its center having a recess 5 at the lower end and a collar 6 with slots 7 through it at the upper end.

Figures 3, 4, 5:
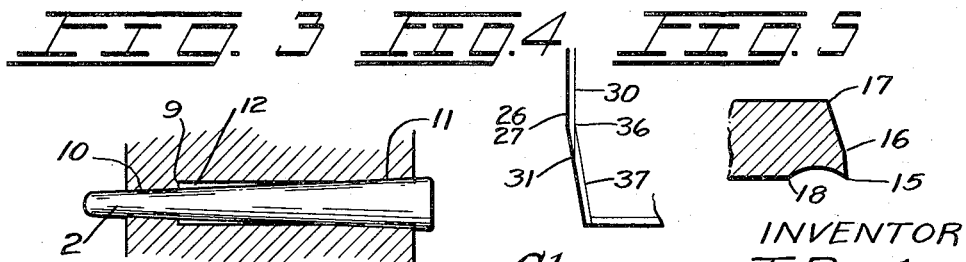
Figure 3 is a sectional view showing the construction of the opening for the tapering pin.
Figure 4 is a view showing the arrangement of the cutting tips of the blades.
Figure 5 is a view showing the cutting edge of one of the blades.

The tapering pins 2 may be of any suitable size and may be placed in slots 8 adjacent the blades as shown in Figure 1. The openings for the tapering pins may be made by drilling a hole from the lower end of the cutter head to a point 9 a short distance from the upper end as shown in Figure 3. The remainder of the hole, as indicated by dotted lines, may be drilled by a drill of a somewhat smaller diameter thus leaving a shoulder at the point 9. The drill may then be removed and a tapering reamer placed in the lower end and forced into the hole until it forms a tapering surface 10 at the upper end, another tapering surface 11 at the lower end and a recess 12 between the two tapering surfaces. This will cause the pin 2 to engage the walls of the opening at the points 10 and 11 so that the binding of the upper and lower ends of the cutter head will be absolutely assured.

Figure 2:
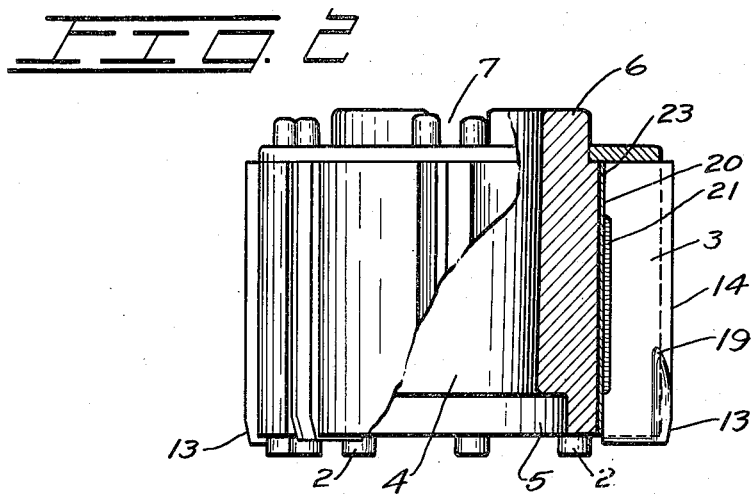
Figure 2 is a side view with part broken away.

The blades 3 may be constructed as shown with their lower edges beveled as shown at the points 13 so that it will be possible to locate the cutter in the center of a cylinder. The cutting edges 14 may be shaped as shown in the section shown in Figure 5. These are formed by setting the cutter blade about one-sixteenth of an inch ahead of the center and then cutting the surface between the points 15 and 16. The blades are then set ahead until the cutting edge is about three-sixteenths of an inch ahead of the center and then the surface between the points 16 and 17 is finished. This will provide a cutting surface between the points 15 and 16 and a clearance between the points 16 and 17. The lower inner surface of the blade is cut away with a slight curve as shown between the points 15 and 18 in Figure 5. This portion will extend from the lower edge to a point 19 a short distance up the blade. The rear edge or seat 20 of the blade may be cut away as shown at 21 in Figure 2 so that the blade will be assured a positive seat at each end. The blades may be placed in grooves 22 in the cutter head and held in place by the tapering pins 2. Their inner edges 20 may be set away from the body of the cutter by placing thin shims 23 under the blades. It is understood that these shims may be of any suitable thickness and may be adjusted to bring the cutting edges of the blades to any suitable distance from the center of the cutter head.

The upper ends of the cutter blades may be held by a plate 24 which is held to the upper end of the cutter head by screws 25.

The blades are arranged in the cutter in such a manner that the outer or cutting edges of two of the blades which I have indicated by the numerals 26 and 27 are set at a somewhat greater distance from the center than the remaining blades. These blades will be known as the finishing blades as in actual practice the intermediate blades will take the rough cut and the finishing, which by this system will be smoother than if all of the blades were cutting the same, will be done by the blades 26 and 27. The beveled surfaces at the lower ends of the blades may be arranged as shown in Figure 4 with the heavy or outer line indicating the cutting edge of the blades 26 and 27. The blades which are approximately at right angles to these blades and which are indicated by the numerals 28 and 29 are set so that the cutting edges will be somewhat inside of the cutting edge of the blades 26 and 27 as indicated by the line 30, however, the beveled surface will be exactly in line with the beveled surface of the blades 26 and 27 as the cutting edge will extend downward to a point 31 before it begins to bevel. This arrangement will provide four points that will engage the upper edge of the cylinder wall when setting the device so that it will be possible to locate it in the true center. The intermediate blades which I have indicated by the numerals 32, 33, 34, and 35 will be set so that their cutting edges will be on the line 30 shown in Figure 4 and their beveled surfaces, which will start at the point 36, will be on the line 37 which is somewhat inside of the line of the beveled surfaces of the other cutter.

It will be understood that changes may be made in the construction without departing from the spirit of the invention. One of which changes may be in the number of blades used in the cutter head as it is understood that any suitable number may be used; another may be in the size or shape of the blades as it is understood that they may be of any suitable length or width or curved as in a spiral; another may be in the means for holding the blades in the cutter head as it is understood that any suitable means may be used in place of the tapering pins shown; and still another may be in the exact shape of the cutting edges of the blades as it is understood that any suitable angles may be used. It is understood that this invention is in the making of a tool of the class described with some of the blades projecting further from the center than others and in the arranging of the blades with the beveled tips at their lower or cutting edges as hereinbefore described and illustrated in Figure 4.

Having thus fully described the invention, what I claim as new and desire to secure by Letters Patent, is:

1. A cylinder reboring tool comprising a head having two sets of cutters thereon, one set consisting of two diametrically opposite cutters and the other set consisting of the cutters spaced between the cutters of the first set, the cutting edges of the first set being set at a slightly greater distance from the center than those of the second set, whereby the cutting edges of the second set are all on a circle the diameter of which is slightly less than the circle embracing the cutting edges of the first set.

2. A cylinder reboring tool having two sets of cutters therein, one set consisting of two cutters which are practically diametrically opposite, and the other set consisting of the cutters spaced between the cutters of the first set, the cutting edges of the first set being set at a slightly greater distance from the center than those at the second set, whereby the cutting edges of the second set are on a circle the diameter of which is slightly less than the circle embracing the cutting edges of the first set.

3. A cylinder reboring tool comprising a head having two sets of cutters therein, one set consisting of two cutters which are practically diametrically opposite whose cutting edges are at a slightly greater distance from the center than those of the remaining cutters, and the other set consisting of cutters spaced between the cutters of the first set.

4. A cylinder reboring tool comprising a head having two sets of cutters therein, one of said sets comprising two cutters whose cutting edges are equally distant from the center, and the other of said sets comprising a plurality of cutters spaced between the cutters of the former set and having their cutting edges arranged so that they will describe a circle which would be of a somewhat smaller diameter than that of a circle described by the two cutters of the first set.

CLARENCE T. ROTTLER.